(12) United States Patent
Wu

(10) Patent No.: US 11,674,663 B1
(45) Date of Patent: Jun. 13, 2023

(54) ILLUMINATION MODULE AND HEAD LIGHT

(71) Applicant: COPLUS INC., Tainan (TW)

(72) Inventor: Jacob Wu, Tainan (TW)

(73) Assignee: COPLUS INC., Tainan (TW)

( * ) Notice: Subject to any disclaimer, the term of this patent is extended or adjusted under 35 U.S.C. 154(b) by 0 days.

(21) Appl. No.: 17/978,675

(22) Filed: Nov. 1, 2022

Related U.S. Application Data

(63) Continuation of application No. 17/540,098, filed on Dec. 1, 2021, now abandoned.

(51) Int. Cl.
*F21V 29/74* (2015.01)
*F21S 45/47* (2018.01)
*B60Q 1/04* (2006.01)
*F21V 21/14* (2006.01)
*F21S 41/19* (2018.01)
*F21S 41/30* (2018.01)
*F21S 41/141* (2018.01)

(52) U.S. Cl.
CPC ............. *F21S 45/47* (2018.01); *B60Q 1/04* (2013.01); *F21S 41/141* (2018.01); *F21S 41/192* (2018.01); *F21S 41/30* (2018.01); *F21V 21/14* (2013.01); *F21V 29/74* (2015.01)

(58) Field of Classification Search
CPC ......... B60Q 1/12; B60Q 1/0683; F21S 45/47; F21S 45/48; F21S 41/321; F21S 41/148; F21V 21/14; F21V 29/74; F21V 29/76; F21V 29/70; F21V 29/745; F21V 29/75

USPC ............................................. 362/523, 40, 53
See application file for complete search history.

(56) References Cited

U.S. PATENT DOCUMENTS 9,267,655 B2 * 2/2016 Tanaka ................. F21S 41/148
2010/0244649 A1 * 9/2010 Inaba ................... F21S 41/148
313/46

FOREIGN PATENT DOCUMENTS

TW   M445667 U  *  1/2013

OTHER PUBLICATIONS

Search English translation of TW M445667 U (Year: 2013).*

* cited by examiner

*Primary Examiner* — Omar Rojas Cadima
(74) *Attorney, Agent, or Firm* — Chun-Ming Shih; HDLS IPR Services

(57) ABSTRACT

A beam pattern module includes a heatsink base, at least one LED light and light reflector housing. The heatsink base includes a base frame and at least one at least one chip mounting surface. The chip mounting surface protrudes on an inner side surface of a base plate of the heatsink base, and the LED light is disposed on the chip mounting surface. The light reflector housing includes a side portion and a reflecting portion. The side portion is provided with a one cut-out. The side portion is fitted on the inner side surface, and the chip mounting surface and the LED light are exposed in the mounting space. The reflecting portion extending from an edge of the side portion and coupled to a rear plate of the base frame, so as to form a single module to be installed to a vehicle light device.

5 Claims, 4 Drawing Sheets

US 11,674,663 B1

ILLUMINATION MODULE AND HEAD LIGHT

CROSS-REFERENCE TO RELATED APPLICATIONS

This application is a Continuation Application that claims priority to U.S. patent application Ser. No. 17/540,098, filed Dec. 1, 2021 and entitled VEHICLE LIGHT DEVICE, which claims priority of Taiwan Patent Application No. 109142468, filed on Dec. 2, 2020.

BACKGROUND

Technical Field

The disclosure relates to a vehicle light device, particularly to a vehicle light device adapted to serve as a headlight of a vehicle.

Related Art

In a conventional vehicle headlight device, several light bulb modules are installed in a light housing, and the conventional vehicle headlight device is operable by a user to switch between a low beam mode and a high beam mode.

In recent years, due to the increasing popularity of light-emitting diodes (LEDs), light bulbs have been gradually replaced by LED lights. Therefore, the components of vehicle light devices, such as the housing and lighting components, also need to be remodeled according to the illumination characteristics of the LED light unit.

SUMMARY

Therefore, the object of the disclosure is to provide a vehicle light device that is equipped with LED lighting units and that is capable of effectively dissipating heat generated by the LED lighting units.

According to the disclosure, a beam pattern module adapted to be installed in a vehicle light device includes a heatsink base, at least one LED light, and a light reflector housing.

The heatsink base includes a base frame. The base frame includes a base plate, a rear plate perpendicular to the base plate and a plurality of cooling fins. The rear plate extends from a rear edge of the base plate, the base plate and the rear plate jointly define a mounting space. The cooling fins are disposed on an outer side surface of the base plate. The base plate further includes an inner side surface facing the mounting space, and a side of the rear plate facing mounting space corresponds a front side of the heatsink base. The chip mounting surface is disposed on the inner side surface of the base plate. The chip mounting surface protrudes on the inner side surface, and the base plate, the rear plate, the plurality of cooling fins and the at least one chip mounting surface are formed monolithically.

The LED light is on the chip mounting surface. The light reflector housing is disposed in the mounting space and includes a side portion and a reflecting portion. The side portion is provided with at least one cut-out running through the side portion; wherein the side portion is fitted on the inner side surface of the base plate, and the at least one chip mounting surface and the at least one LED light are exposed in the mounting space from the cut-out. The reflecting portion extends from an edge of the side portion and coupled to the rear plate of the base frame.

The reflecting portion includes a curved reflecting surface facing the mounting space, and the reflecting surface is configured to reflect light emitted by the LED light to project the light to the front side of the heatsink base.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
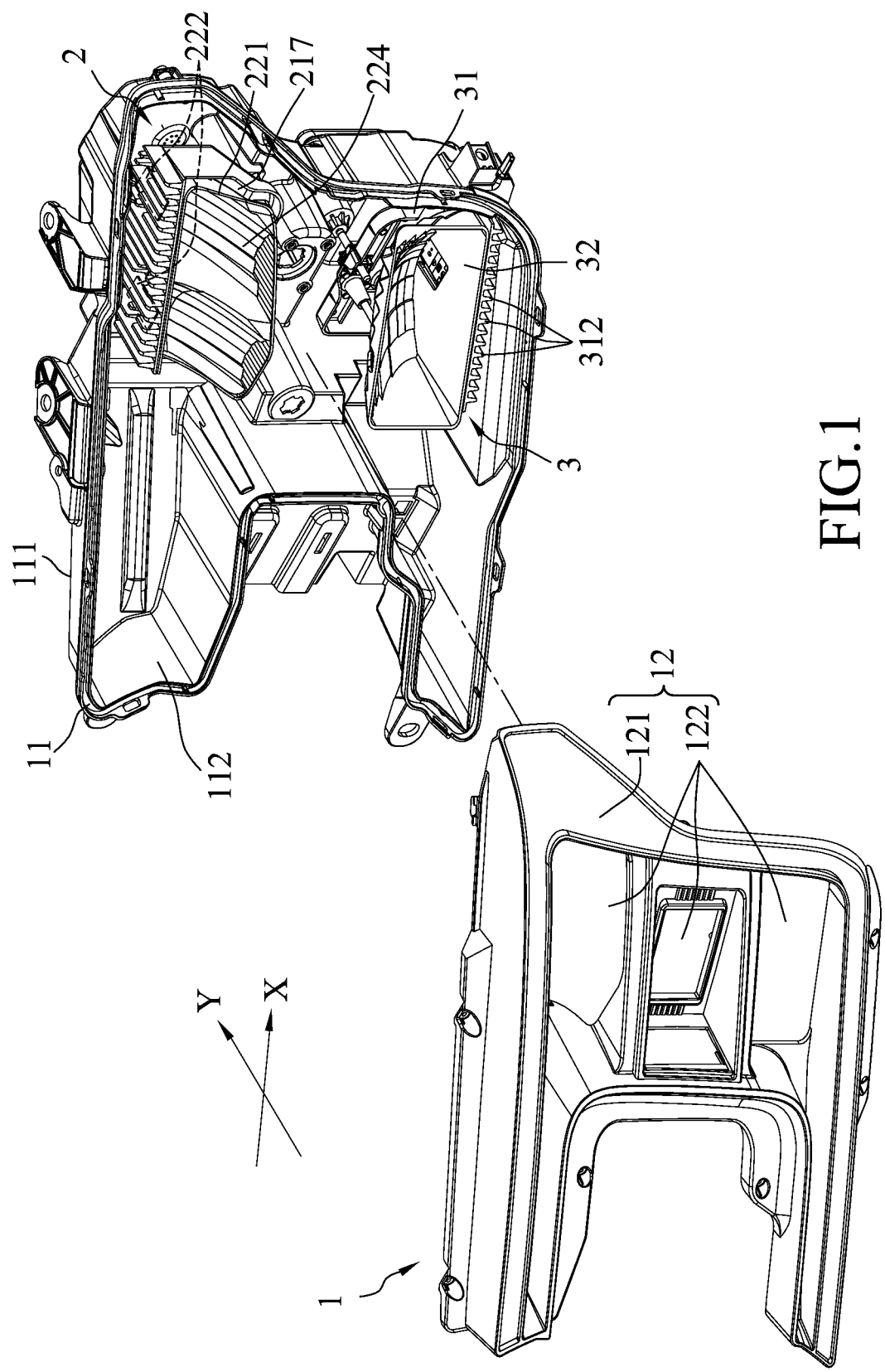
FIG. 1 is a partly exploded perspective view illustrating an embodiment of the vehicle light device according to the disclosure.
Figure 2:
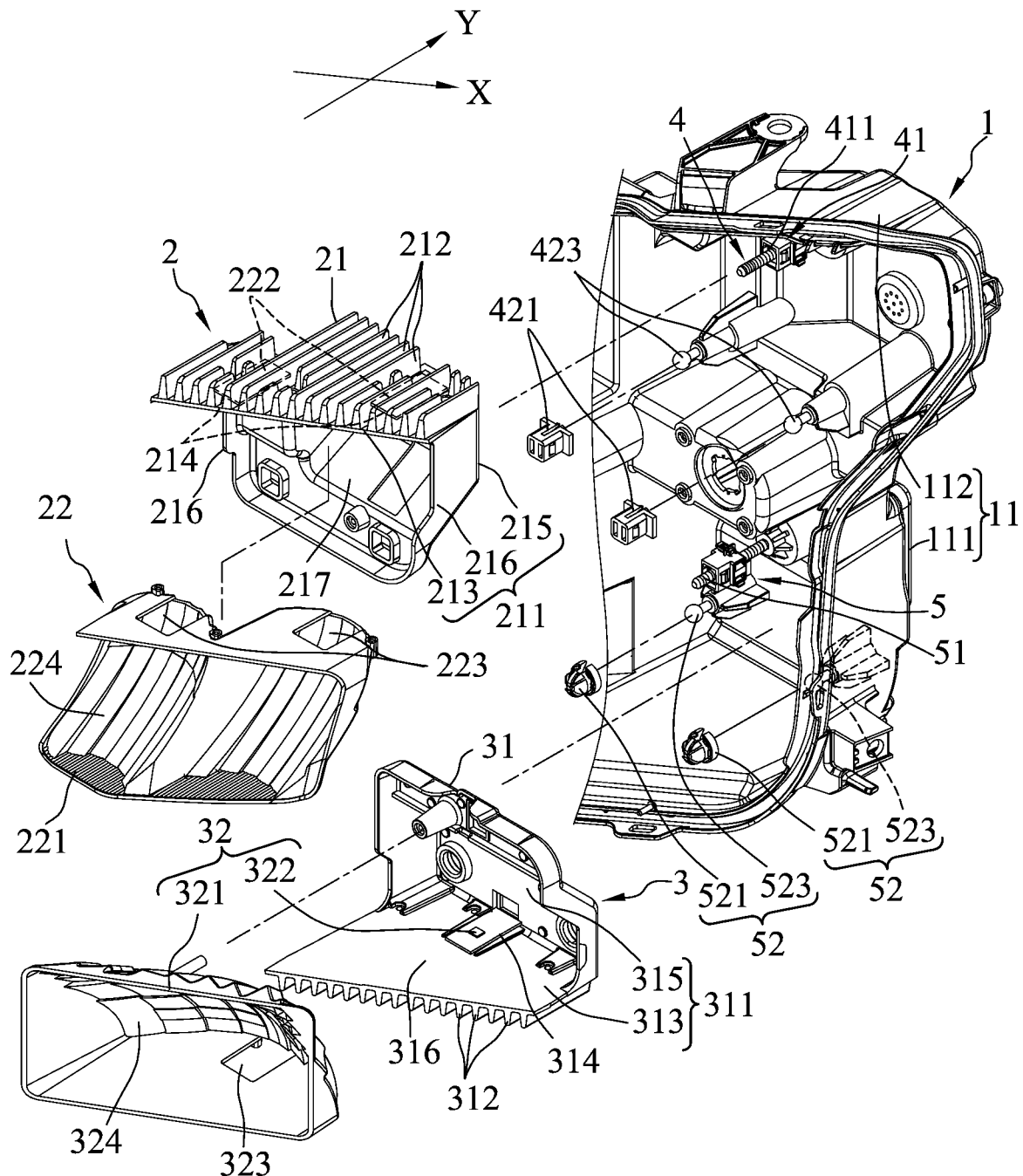
FIG. 2 is an exploded perspective view of the embodiment.
Figure 3:
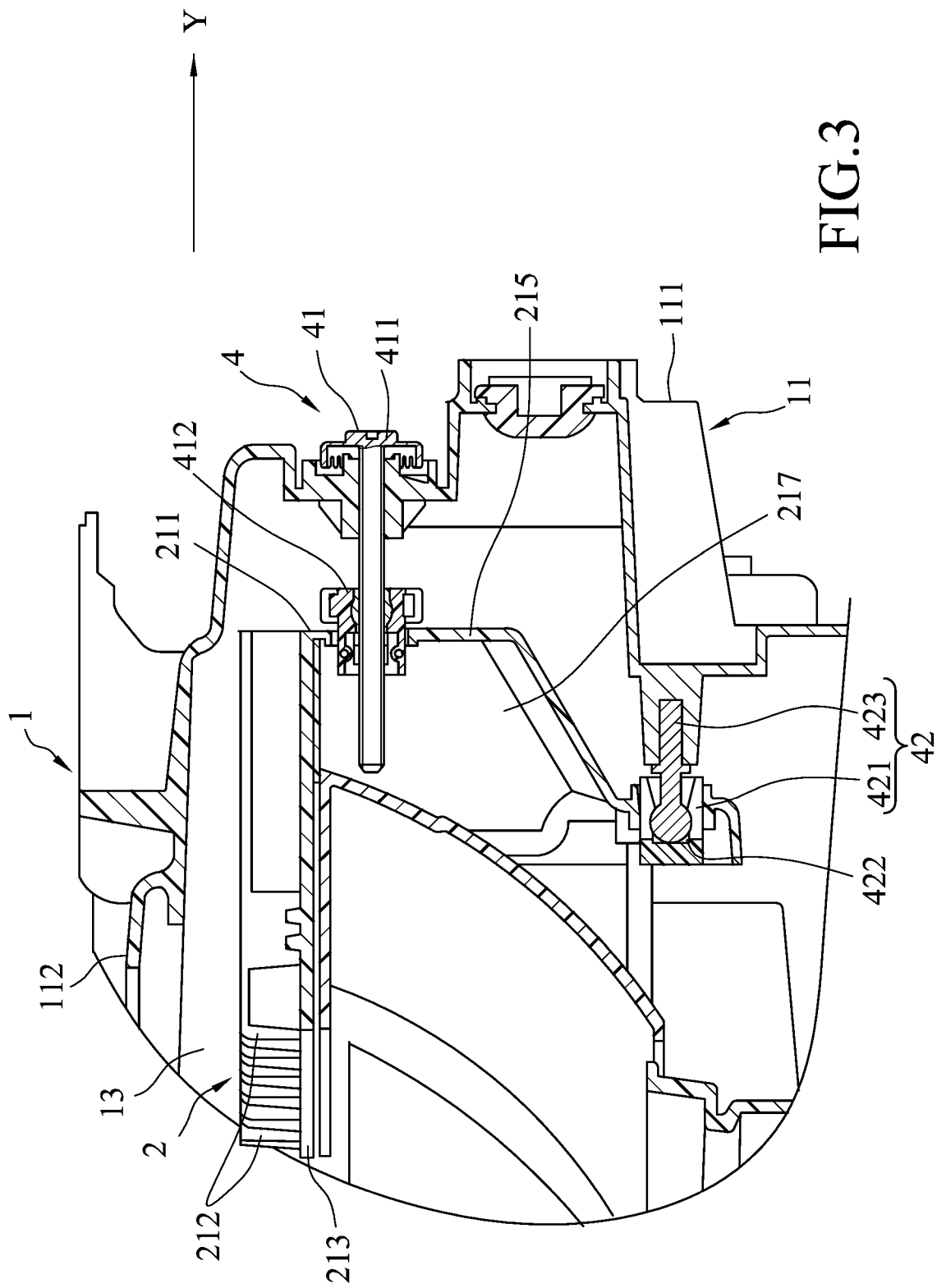
FIG. 3 is a fragmentary cross-sectional view illustrating a first beam pattern module and a first adjustment module of the embodiment.

As shown in FIGS. 1 to 3, the embodiment of the vehicle light device according to the present disclosure is adapted to be installed on a front side of a vehicle (not shown) to serve as a headlight. To be consistent with the directions shown in the diagrams, the left and right directions as referred to when relating the vehicle light device are based on a person facing the vehicle. The vehicle light device includes a housing module 1 and, mounted to that, a first beam pattern module 2, a second beam pattern module 3, a first adjustment module 4, and a second adjustment module 5. If the vehicle light device is installed on a front left side of the vehicle, it will have a symmetrical structure with respect to a vehicle's central axis.

The housing module 1 is adapted to be installed on the vehicle, and includes a light housing 11 and a housing cap 12 covering a front end of the light housing 11. The light housing 11 and the housing cap 12 cooperate to define an installation space 13. The light housing 11 has a mounting portion 111 and a surrounding portion 112 extending forward from the mounting portion 111. The housing cap 12 has a cap body 121 coupled to a front end of the surrounding portion 112 of the light housing 11, and a plurality of transparent regions 122 arranged on the cap body 121 and vertically spaced apart from one another. The light housing 11 and the housing cap 12 are mainly made of plastic materials.

The first beam pattern module 2 is positioned in the installation space 13 of the housing module 1, and includes a first heatsink base 21 mounted on the mounting portion 111 of the light housing 11 and a first LED lighting unit 22 mounted on a front side of the first heatsink base 21 for projecting a first beam pattern forward.

The first heatsink base 21 is made of an aluminum based material, and includes a first base frame 211 mounted on the light housing 11 and a plurality of first cooling fins 212 protruding vertically and upwardly from a top end of the first base frame 211. The first base frame 211 includes a first base plate 213 that extends horizontally and that has two spaced-apart first chip mounting surfaces 214 facing downward. The first base frame 211 further has a first rear plate 215 that extends downward from a rear edge of the first base plate 213, and a pair of first side plates 216 that extend vertically.

One of the first side plates 216 is connected between a right end of the first base plate 213 and a right end of the first rear plate 215, and the other one of the first side plates 216 is connected between a left end of the first base plate 213 and a left end of the first rear plate 215. The right one of the first side plates 216 has a greater width in a front-rear direction (Y) than that of the left one of the first side plates 216 to reinforce the first base frame 211 to withstand external force. If the vehicle light device is installed on the front left side of the vehicle, the first side plate 216 on the left side should then have a greater width than the first side plate 216 on the right side for the same purpose. The first base plate 213, the first rear plate 215, and the first side plates 216 cooperatively define a first mounting space 217 with a forward opening. The first cooling fins 212 protrude vertically and upwardly from a top side of the first base plate 213 and are arranged at intervals in a left-right direction (X) transverse to the front-rear direction (Y). Each first cooling fin 212 is formed as a rectangular piece being elongated in the front-rear direction (Y).

In this embodiment, the first LED lighting unit 22 includes a first light reflector housing 221 mounted in the first mounting space 217 of the first base frame 211 and positioned in front of the first rear plate 215, and two first LED lights 222 spaced apart from each other and mounted respectively to the two first chip mounting surfaces 214 of the first base frame 211. The first light reflector housing 221 has two first cut-outs 223 that are formed in the top side thereof and that are spaced apart from each other, and a curved first reflecting surface 224. Each first LED light 222 is exposed from a respective first cut-out 223 of the first light reflector housing 221. As such, light beams emitted from the first LED lights 222 can be reflected by the first reflecting surface 224, pass through the corresponding transparent region 122, and form the first beam pattern.

It should be noted that the number of the first LED lights 222 is not limited to two and may be one, three . . . etc., according to actual requirements. In this embodiment, each first LED light 222 is a rectangular chip-on-board type LED light. This is familiar to one skilled in the art, and further description is omitted.

The first adjustment module 4 includes a first adjustment unit 41 and two spaced-apart first pivoting units 42 installed to the mounting portion 111 of the light housing 11. The first adjustment unit 41 includes a first adjustment screw 411 extending through the mounting portion 111 of the light housing 11 and the first rear plate 215 of the first base frame 211, and a first nut member 412 fixed to the first rear plate 215 of the first base frame 211 and engaged with the first adjustment screw 411. The first adjustment screw 411 is rotatable about its own axis to produce a forward or backward linear motion of the first nut member 412 with the first base frame 211. Therefore, the first adjustment screw 411 can be manipulated to rotate to move the first rear plate 215 of the first heatsink base 21 toward or away from the mounting portion 111 of the light housing 11. Each first pivoting unit 42 includes a first retaining member 421 positioned below the first adjustment unit 41 and extending through the first rear plate 215. The first retaining member 421 has an interference fit hole 422, which has a front portion, a rear portion, and a neck portion interconnecting the front and rear portions and being smaller than the front and rear portions. The rear portion of the interference fit hole 422 has an open end at a rear end thereof, and gradually widens from the neck portion of the interference fit hole 422 to the open end. The first pivoting unit 42 further includes a first pivot 423 with a rear end fixed to the mounting portion 111 of the light housing 11 and a spherical front end tightly fitted in the front portion of the interference fit hole 422.

Figure 4:
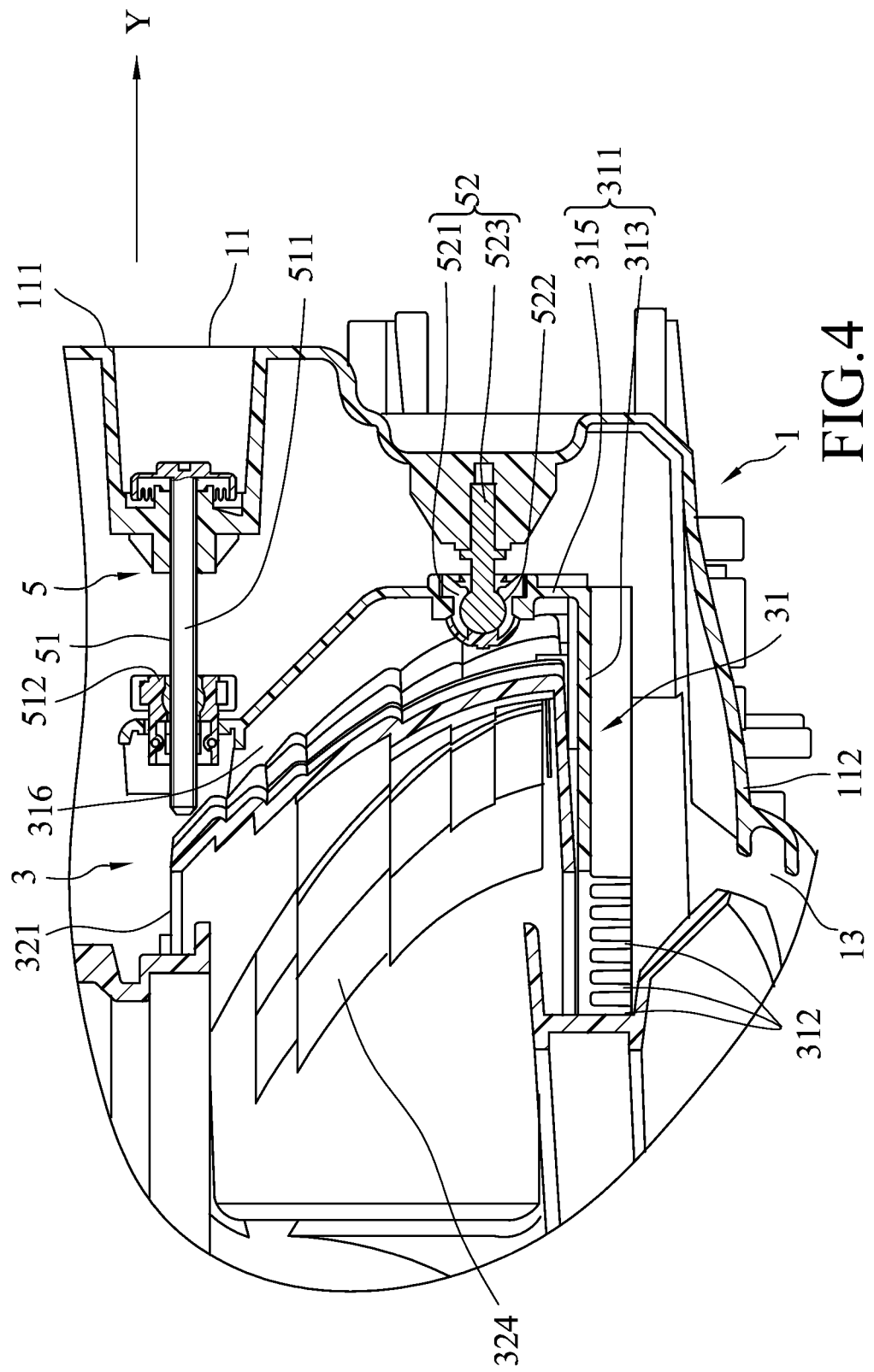
FIG. 4 is a fragmentary cross-sectional view illustrating a second beam pattern module and a second adjustment module of the embodiment.

Referring to FIGS. 1, 2, and 4, the second beam pattern module 3 is positioned in the installation space 13 of the housing module 1, is disposed under and spaced apart from the first beam pattern module 2, and includes a second heatsink base 31 assembled to the light housing 11 and a second LED lighting unit 32 mounted on a front side of the second heatsink base 31 for projecting a second beam pattern forward.

The second heatsink base 31 is made of an aluminum based material, and includes a second base frame 311 mounted on the mounting portion 111 of the housing 11 and a plurality of second cooling fins 312 protruding vertically and downwardly from a bottom end of the second base frame 311. The second base frame 311 has a second base plate 313 that extends horizontally and that has a second chip mounting surface 314 facing upward. The second base frame 311 further has a second rear plate 315 that extends upward from a rear edge of the second base plate 313. The second base plate 313 and the second rear plate 315 cooperatively define a second mounting space 316. The second cooling fins 312 protrude vertically and downwardly from a bottom side of the second base plate 313 and are arranged at intervals in the left-right direction (X). Each second cooling fin 312 is a rectangular piece being elongated in the front-rear direction (Y).

The second LED lighting unit 32 includes a second light reflector housing 321 mounted in the second mounting space 316 of the second base frame 311, and a second LED light 322 mounted to the second chip mounting surface 314 of the second base frame 311. The second light reflector housing 321 has a second cut-out 323 that is formed in the bottom side thereof, and a curved second reflecting surface 324. The second LED light 322 is exposed from the second cut-out 323 of the second light reflector housing 321. As such, light beams emitted from the second LED light 322 can be reflected by the second reflecting surface 324, pass through the corresponding transparent region 122, and form the second beam pattern.

It should be noted that more than one of the second LED light unit 322 may be used according to actual requirements. In this embodiment, the second LED light 322 is a rectangular chip-on-board type LED light. This is familiar to one skilled in the art, and further description is omitted.

The second adjustment module 5 includes a second adjustment unit 51 positioned below the first adjustment unit 41, and two spaced-apart second pivoting units 52 installed to the mounting portion 111 of the light housing 11. The second adjustment unit 51 includes a second adjustment screw 511 extending through the mounting portion 111 of the light housing 11 and the second rear plate 315 of the second base frame 311, and a second nut member 512 fixed to the second rear plate 315 of the second base frame 311 and engaged with the second adjustment screw 511. The second adjustment screw 511 is rotatable about its own axis to produce a forward or backward linear motion of the second nut member 512 with the second base frame 311. Therefore, the second adjustment screw 511 can be manipulated to rotate to move the second rear plate 315 of the second heatsink base 31 toward or away from the mounting portion 111 of the light housing 11. Each second pivoting unit 52 includes a second retaining member 521 positioned below the second adjustment unit 51 and extending through the second rear plate 315. The second retaining member 521 has an interference fit hole 522, which has a front portion, a rear portion, and a neck portion interconnecting the front and rear portions. The rear portion of the interference fit hole 522 has an open end at a rear end thereof, and widens from the neck portion of the interference fit hole 522 to the open end. The second pivoting unit 52 further includes a second pivot 523 with a rear end fixed to the mounting portion 111 of the light housing 11 and a spherical front end tightly fitted in the front portion of the second interference fit hole 522.

Referring to FIG. 1, with the utilization of the vehicle light device as disclosed, a user can control the vehicle light device to switch between the low beam mode where the first beam pattern module 2 projects the first beam pattern forward, and the high beam mode where the second beam pattern module 3 projects the second beam pattern forward. In other variations of this embodiment, the functions of the first beam pattern module 2 and the second beam pattern module 3 can be exchanged so that the first beam pattern module 2 serves as the high beam mode, the second beam pattern module 3 serves as the low beam mode.

Referring to FIGS. 1 to 3, when the user rotates the first adjustment screw 411, a linear displacement of the first nut member 412 will slightly vary the distance between the upper part of the first heatsink base 21 and the mounting portion 111 of the light housing 11, and this will cause the first heatsink base 21 to rotate forward or backward about pivot points on the spherical front ends of the first pivots 423, thus varying the inclination of the first reflecting surface 224 of the first light reflector housing 221 relative to the housing module 1, such that the first beam pattern can be slightly adjusted to compensate for manufacturing error.

Referring to FIGS. 1 to 4, similar to the first adjustment module 4, when the user rotates the second adjustment screw 511, a linear displacement of the second nut member 512 will slightly vary the distance between the upper part of the second heatsink base 31 and the mounting portion 111 of the light housing 11, and this will cause the second heatsink base 31 to rotate forward or backward about pivot points on the spherical front ends of the second pivots 523, thus varying the inclination of the second reflecting surface 324 of the second light reflector housing 321 relative to the housing module 1, such that the second beam pattern can be slightly adjusted.

Moreover, it is noted that, the vehicle light device can further include an additional LED light unit (not shown in the Figures) installed in the housing module 1 and positioned between the first beam pattern module 2 and the second beam pattern module 3, such that the vehicle light device possesses the function of a daytime running light in addition to being a headlight.

With the arrangement of the first heatsink base 21 with the first cooling fins 212 and the second heatsink base 31 with the second cooling fins 312, the heat generated by the first LED lights 222 of the first LED lighting unit 22 which are positioned on the upper portion of the housing module 1 can be dissipated upward from the first base frame 211 through the first cooling fins 212; the heat generated by the second LED lighting unit 32 which is positioned on the lower portion of the housing module 1 can be dissipated downward from the second base frame 311 through the second cooling fins 312. Therefore, the heat-dissipation efficiency can be improved. The first LED lights 222 and the second LED light 322 would less likely be damaged after a long time of use due to heat accumulation, thereby effectively prolonging the service life of the vehicle light device.

In summary, the vehicle light device of the present disclosure can improve the heat dissipation efficiency through the arrangement of the first cooling fins 212 and the second cooling fins 312 to face opposite directions. Accordingly, the purpose of the invention can be achieved.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A beam pattern module (2, 3), adapted to be installed in a vehicle light device, comprising:
    a heatsink base (21, 31), including:
        a base frame (211, 311), including a base plate (213, 313), a rear plate (215, 315) perpendicular to the base plate (213, 313), at least one side plate (216) and a plurality of cooling fins (212, 312); wherein the rear plate (215, 315) extends from a rear edge of the base plate (213, 313), the side plate (216) extend from edges of the base plate (213, 313) and the rear plate (215,315), the base plate (213, 313), the side plate (216) and the rear plate (215, 315) jointly define a mounting space (217, 316), the plurality of cooling fins (212, 312) are disposed on an outer side surface of the base plate (213, 313), the base plate (213, 313) further includes an inner side surface facing the mounting space (217, 316), and a side of the rear plate (215, 315) facing mounting space (217, 316) corresponds a front side of the heatsink base (21, 31); and
        at least one chip mounting surface (214, 314), disposed on the inner side surface of the base plate (213, 313); wherein the chip mounting surface (214, 314) protrudes on the inner side surface, and the base plate (213, 313), the rear plate (215, 315), the plurality of cooling fins (212, 312) and the at least one chip mounting surface (214, 314) are formed monolithically, wherein cooling fins (212, 312) and the chip mounting surface (214, 314) are respectively disposed on two corresponding surfaces of the base plate (213, 313);
    at least one LED light (222, 322), disposed on the chip mounting surface (214, 314); and
    a light reflector housing (221, 321), embedded in the mounting space (217, 316) and including:
        a side portion, provided with at least one cut-out (223, 323) running through the side portion; wherein the side portion is fitted on the inner side surface of the base plate (213, 313), and the at least one chip mounting surface (214, 314) and the at least one LED light (222, 322) are exposed in the mounting space (217, 316) from the cut-out (223, 323); and a reflecting portion extending from an edge of the side portion and coupled to the rear plate (215, 315) of the base frame (211, 311); wherein the reflecting portion includes a curved reflecting surface (224, 324) facing the mounting space (217, 316), and the curved reflecting surface (224, 324) is configured to reflect light emitted by the LED light (222, 322) to project the light to the front side of the heatsink base (21, 31).

2. The beam pattern module (2, 3) as claimed in claim 1, wherein the plurality of cooling fins (212, 312) are arranged in parallel and spaced from each other.

3. A vehicle light device, adapted to be installed on a front side of a vehicle, comprising:

a light housing (11), including a mounting portion (111) and a surrounding portion (112) extending forward from a peripheral of the mounting portion (111); and at least one beam pattern module (2, 3) as claimed in claim 1; wherein the base plate (213, 313) is installed to mounting portion (111), and the beam pattern module (2, 3) is surrounded by the surrounding portion (112).

4. The vehicle light device as claimed in claim 3, further comprising a housing cap (12), coupled to a front end of the surrounding portion (112) of the light housing (11) to define an installation space (13) between the light housing (11) and the housing cap (12); wherein the beam pattern module (2, 3) is located within the installation space (13).

5. The vehicle light device as claimed in claim 4, wherein the housing cap (12) includes a cap body (121) coupled to the front end of the surrounding portion (112), and a plurality of transparent regions (122) arranged on the cap body (121) and spaced apart from one another.

* * * * *